(12) United States Patent
Shibayama (10) Patent No.: US 9,909,929 B2
(45) Date of Patent: Mar. 6, 2018

(54) TEMPERATURE SENSOR AND PROCESS OF MANUFACTURING SAME

(71) Applicant: DENSO CORPORATION, Kariya, Aichi-pref. (JP)

(72) Inventor: Susumu Shibayama, Anjo (JP)

(73) Assignee: DENSO CORPORATION, Kariya (JP)

( * ) Notice: Subject to any disclaimer, the term of this patent is extended or adjusted under 35 U.S.C. 154(b) by 205 days.

(21) Appl. No.: 14/753,419

(22) Filed: Jun. 29, 2015

(65) Prior Publication Data
US 2015/0377713 A1   Dec. 31, 2015

(30) Foreign Application Priority Data

Jun. 30, 2014  (JP) .................. 2014-133464
Feb. 27, 2015  (JP) .................. 2015-038315

(51) Int. Cl.
G01K 1/00      (2006.01)
G01K 13/00     (2006.01)
G01K 7/00      (2006.01)
G01K 1/08      (2006.01)

(52) U.S. Cl.
CPC ........... G01K 1/08 (2013.01); *G01K 2205/04* (2013.01)

(58) Field of Classification Search
USPC ........................................ 374/208, 163, 148
See application file for complete search history.

(56) References Cited

U.S. PATENT DOCUMENTS 6,591,052 B1   7/2003  Hosouchi et al.

FOREIGN PATENT DOCUMENTS

| CN | 103471739 | 12/2013 |
|---|---|---|
| JP | 55-18136 | 7/1978 |
| JP | 55-38233 | 9/1980 |
| JP | H08-050061 | 2/1996 |
| JP | 2001-013331 | 1/2001 |
| JP | 2001-141573 | 5/2001 |
| JP | 2001-356058 | 12/2001 |
| JP | 2002-022555 | 1/2002 |
| JP | 2005-017070 | 1/2005 |

OTHER PUBLICATIONS

Translation of JP2001356058 Dec. 26, 2001.*

* cited by examiner

*Primary Examiner* — Mirellys Jagan
(74) *Attorney, Agent, or Firm* — Nixon & Vanderhye P.C.

(57) ABSTRACT

A temperature sensor includes a temperature detecting section including a temperature-sensitive element, a cylindrical housing disposed on a proximal end side of the temperature detecting section, a connector member disposed on a proximal end side of the housing, and a buffer member which is elastically deformable and disposed between the connector member and the housing. The connector member includes a connector counter surface located on a side of the housing in an axial direction along a longitudinal axis of the housing. The housing includes a housing counter surface located opposite to the connector counter surface. The housing counter surface and the connector counter surface are separated from each other so that a gap is present therebetween. The buffer member is disposed deformably in the gap so that the connector member and the housing are movable relative to each other in the axial direction.

7 Claims, 7 Drawing Sheets

TEMPERATURE SENSOR AND PROCESS OF MANUFACTURING SAME

This application claims priority to Japanese Patent Application No. 2014-133464 filed on Jun. 30, 2014, and No. 2015-38315 filed on Feb. 27, 2015, the entire contents of which are hereby incorporated by reference.

BACKGROUND OF THE INVENTION

1. Field of the Invention

The present invention relates to a temperature sensor and a process of manufacturing the temperature sensor.

2. Description of Related Art

Generally, internal combustion engines of vehicles are provided with a temperature sensor for measuring the temperature of exhaust gas and so on. Japanese Patent Application Laid-open No. H8-50061 describes a temperature sensor having a structure in which its connector is integrally fixed to its main body to reduce the manufacturing cost and to increases the productivity.

More specifically, one end portion of the connector is inserted into a housing formed in a cylindrical shape, and integrally fixed to the housing by wrap-swaging the housing. The housing and the connector abut against each other in the axial direction. The housing is formed with threads at its outer lateral surface so that it can be screwed to a tapped hole formed in an internal combustion engine or the like.

However, the above conventional temperature sensor has problems as described below. In this temperature sensor, the connector and the housing are fixed to each other in the state where they abut against each other in the axial direction. Accordingly, vibration of the internal combustion engine or the like is easily transmitted to the connector through the housing. If the vibration transmitted to the connector is large, rubbing occurs between this connector and a connector of an external unit electrically connected to the temperature sensor. In this case, there is a concern that terminals of the connector of the temperature sensor and terminals of the connector of the external unit may be worn away. Further, since the housing and the connector are integrally fixed to each other by wrap-swaging the housing, there is a concern that residual stress is present in the connector because the connector is pressed by the swaging. To reduce the residual stress in the connector, since it is necessary to adjust the amount of the swaging and so on, the productivity is lowered.

SUMMARY

An exemplary embodiment provides a temperature sensor including:

a temperature detecting section including a temperature-sensitive element;

a cylindrical housing disposed on a proximal end side of the temperature detecting section;

a connector member disposed on a proximal end side of the housing; and a buffer member which is elastically deformable and disposed between the connector member and the housing, wherein the connector member includes a connector counter surface located on a side of the housing in an axial direction along a longitudinal axis of the housing;

the housing includes a housing counter surface located opposite to the connector counter surface, the housing counter surface and the connector counter surface are separated from each other so that a gap is present therebetween, and the buffer member is disposed deformably in the gap so that the connector member and the housing are movable relative to each other in the axial direction.

The exemplary embodiment provides also a process of manufacturing a temperature sensor, the temperature sensor including:

a temperature detecting section including a temperature-sensitive element;

a cylindrical housing disposed on a proximal end side of the temperature detecting section;

a connector member disposed on a proximal end side of the housing; and a buffer member which is elastically deformable and disposed between the connector member and the housing, the connector member including a connector counter surface located on a side of the housing in an axial direction along a longitudinal axis of the housing, the housing including a housing counter surface opposite to the connector counter surface, the housing counter surface and the connector counter surface being separated from each other so that a gap is present therebetween, the buffer member being disposed deformably in the gap so that the connector member and the housing are movable relative to each other in the axial direction, the connector member including a brim part projecting in a radial direction perpendicular to the axial direction, the housing including a cylindrical connection part which extends toward the connector member so as to house the brim part therein, the process including the steps of:

disposing the brim part inside the connection part in a state where the buffer member is disposed in the gap; and deforming one end portion on a side of the connector member of the connection part such that the one end portion extends toward the housing within the connection part to form a wrap-swaged part wrapping the brim part therein, wherein a processing load for deforming the connection part and a processing time elapsed from when the connection part starts to be deformed are measured during formation of the wrap-swaged part, the formation of the wrap-swaged part being finished when the processing load exceeds a predetermined threshold load and the processing time exceeds a predetermined threshold time.

According to the exemplary embodiment, there is provided a temperature sensor capable of greatly reducing vibration transmission from its housing to its connector member. According to the exemplary embodiment, there is provided also a process for manufacturing the temperature sensor at a high productivity.

Other advantages and features of the invention will become apparent from the following description including the drawings and claims.

PREFERRED EMBODIMENTS OF THE INVENTION

Figure 1:
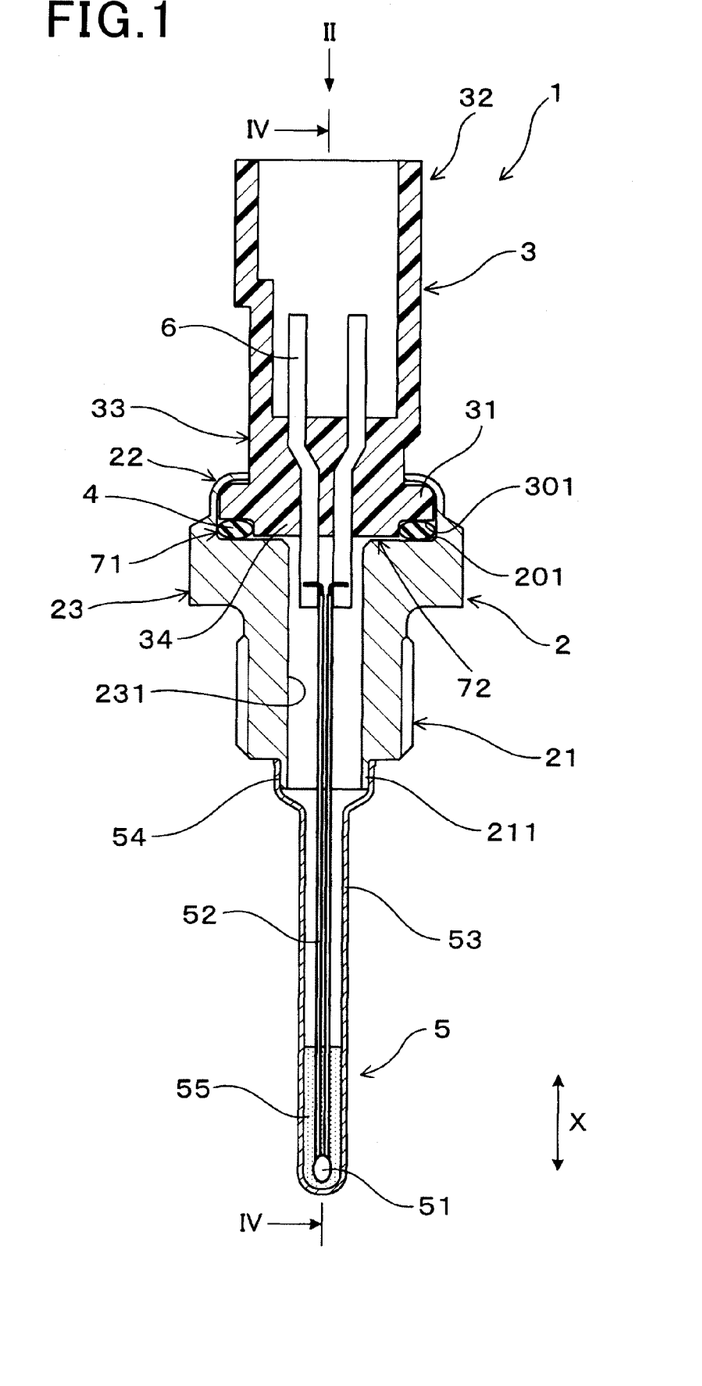
FIG. 1 is a cross-sectional view of a temperature sensor according to an embodiment of the invention.

A temperature sensor 1 according to an embodiment of the invention is described with reference to FIGS. 1 to 5. As shown in FIG. 1, the temperature sensor 1 includes a temperature detecting section 5, a housing 2, a connector member 3 and a buffer member 4. The temperature detecting section 5 includes a temperature-sensitive element 51. The housing 2 is formed in a cylindrical shape and disposed on the proximal end side of the temperature detecting section 5. The connector member 3 is disposed on the proximal end side of the housing 2. The buffer member 4, which is elastically deformable, is disposed between the connector member 3 and the housing 2.

As shown in FIGS. 1 to 4, the connector member 3 includes a connector counter surface 301 located on the side of the housing 2 in the axial direction of the housing 2. The housing 2 includes a housing counter surface 201 located opposite to the connector counter surface 301. The buffer member 4 is disposed in a gap 71 formed between the connector counter surface 301 and the housing counter surface 201. Since the buffer member 4 is deformable, the connector member 3 and the housing 2 are movable relative to each other in the axial direction X.

In the following description, the side on which the temperature detecting section 5 is disposed in the axial direction X is referred to as the distal end side, and the side opposite to the distal end side is referred to as the proximal end side. The temperature sensor 1 is for measuring the temperature of exhaust gas within the exhaust manifold of an internal combustion engine of a vehicle. However, the temperature sensor 1 can be used for measuring the temperature of exhaust gas flowing through an exhaust pipe, and the temperature of cooling water flowing through a cooling pipe.

As shown in FIG. 1, the temperature sensor 1 includes the cylindrical housing 2, the connector member 3 disposed on the proximal end side of the housing 2, and the temperature detecting section 5 disposed on the distal end side of the housing 2. The temperature detecting section 5 includes the temperature-sensitive element 51, a protection tube 53 housing the temperature-sensitive element 51, and a filler member 55 for fixing the temperature-sensitive element 51 within the protection tube 53. The temperature-sensitive element 51 includes a pair of element electrode wires 52 which extend to the proximal end side. The pair of the element electrode wires 52 are electrically connected to a pair of terminals 6 disposed within the connector member 3, respectively.

The protection tube 53 is formed in a shape of a bottomed cylinder, and disposed in a state of the bottom end thereof being the distal end of the temperature sensor 1. The proximal end portion of the protection tube 53 is formed with a diameter-enlarged part 54 whose diameter is larger than that of the distal end portion thereof. The protection tube 53 is fixed to the housing 2 by fitting the diameter-enlarged part 54 and the housing 2 together. The filler member 55 is filled in the distal end portion of the protection tube 53 so as to surround the pair of the element electrode wires 52 on the distal end side. The filler member 55 may be cement.

The housing 2 includes a housing fixing part 21 located on the distal end side, a jig engaging part 23 located on the proximal end side of the housing fixing part 21, and a wrap-swaged part 22 located on the proximal end side of the jig engaging part 23. The housing fixing part 21 is formed in roughly a cylindrical shape, and formed with threads at is outer lateral surface. The temperature sensor 1 can be fixed to the exhaust manifold by screwing the housing fixing part 21 into a tapped hole formed in the exhaust manifold. The end surface on the distal end side of the housing fixing part 21 is formed with a distal projecting part 211 projecting to the distal end side. The diameter-enlarged portion 54 of the protection tube 53 is fitted to the distal projecting part 211.

Figure 2:
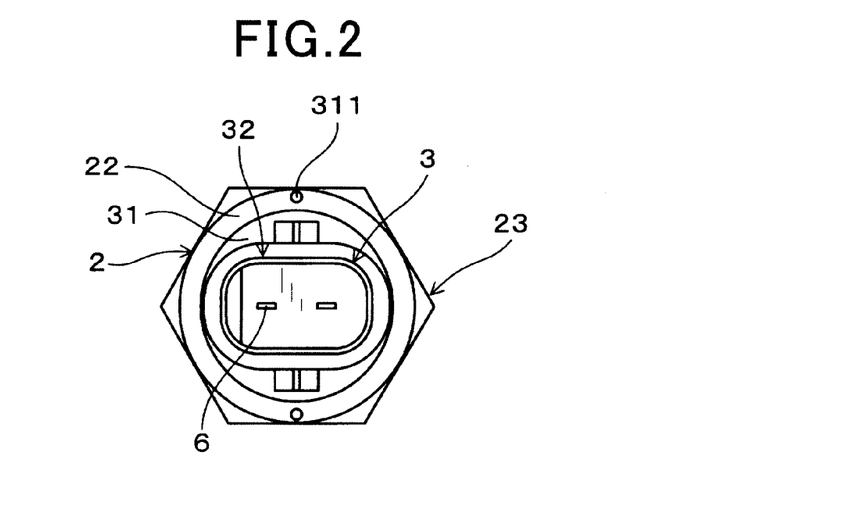
FIG. 2 is a view of the temperature sensor as viewed from the arrow II in FIG. 1.
Figure 6:
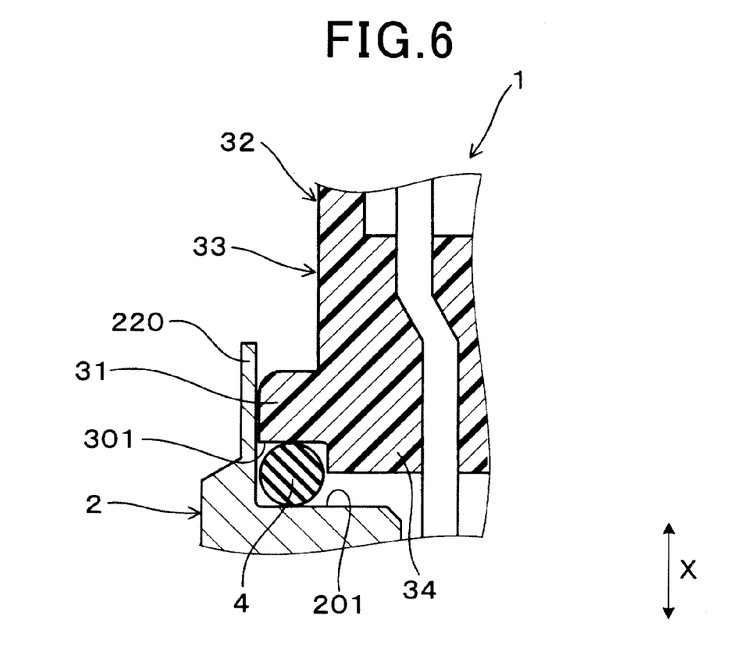
FIG. 6 is a partial cross-sectional view of the temperature sensor before forming a wrap-swaged part.
Figure 7:
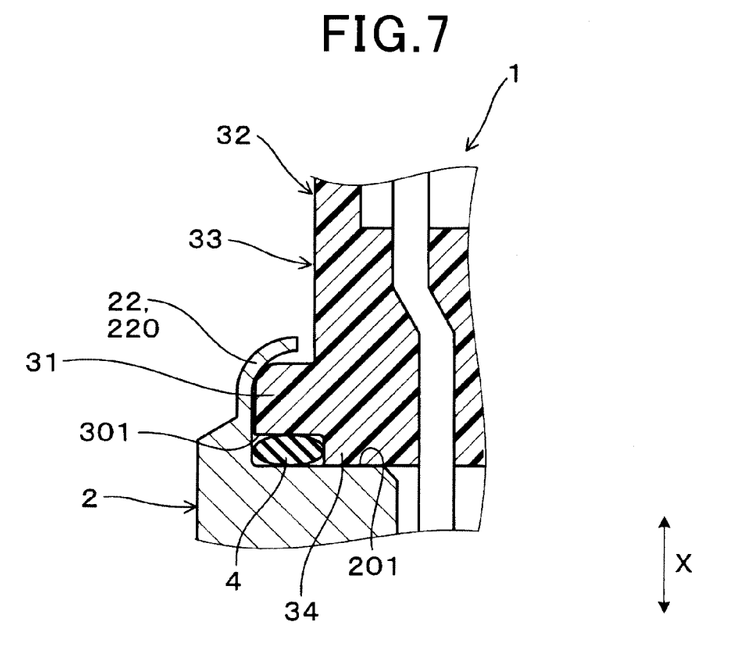
FIG. 7 is a partial cross-sectional view of the temperature sensor in the course of forming the wrap-swaged part.

As shown in FIGS. 1 and 2, the jig engaging part 23 has a shape of a hexagon when viewed in the axial direction X, and is formed with a through hole 231 whose inner periphery is continuous to the inner periphery of the housing fixing part 21. As shown in FIGS. 6 and 7, the wrap-swaged part 22 is a cylindrical connection part 220 before the housing 2 and the connector member 3 are fixed to each other. The connection part 220 extends from the jig engaging part 23 to the proximal end side. The connection part 220 is formed with a pair of convex engaging portions 221 projecting radially inwardly. The pair of the convex engaging portions 221 are located oppositely to each other.

The connection part 220 and the jig engaging part 23 constitute a bottomed cylinder whose bottom surface is formed of the jig engaging part 23. The bottom surface formed of the jig engaging part 23 makes the housing counter surface 201 opposite to the connector counter surface 301. The wrap-swaged part 22 is formed by deforming the connection part 220 to a shape wrapping a brim part 31 of the connector member 3.

Figure 3:
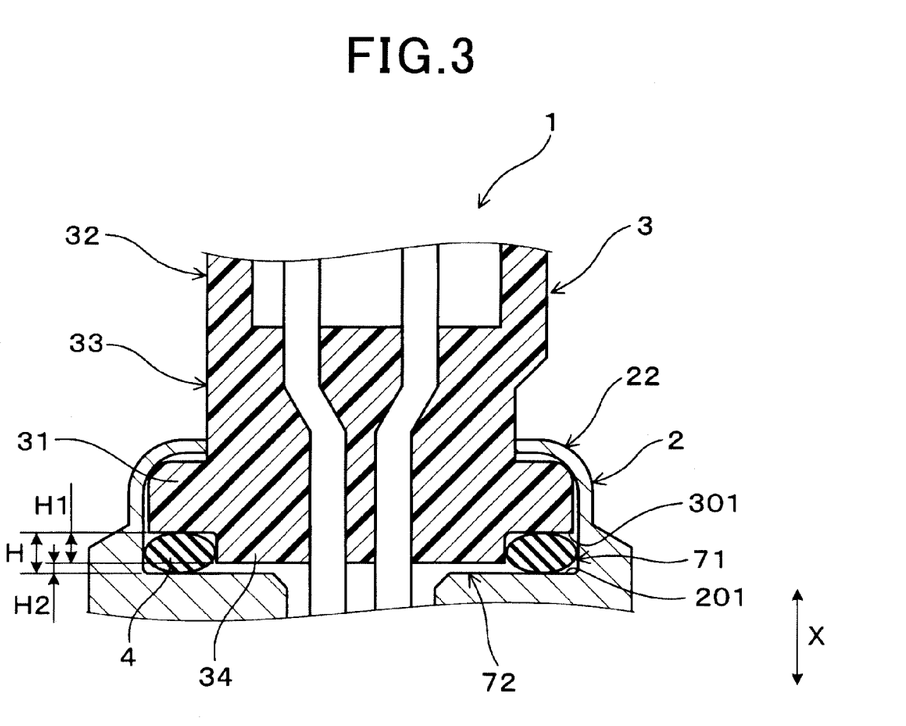
FIG. 3 is a partial enlarged view of FIG. 1.
Figure 4:
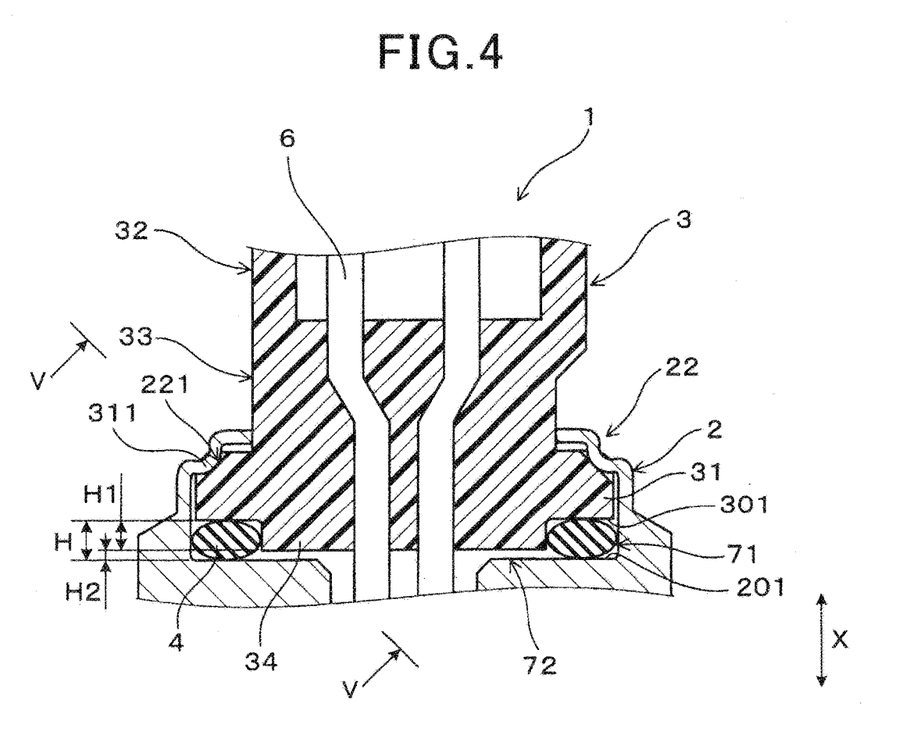
FIG. 4 is a partial cross-sectional view of FIG. 1 taken along line IV-IV.
Figure 5:
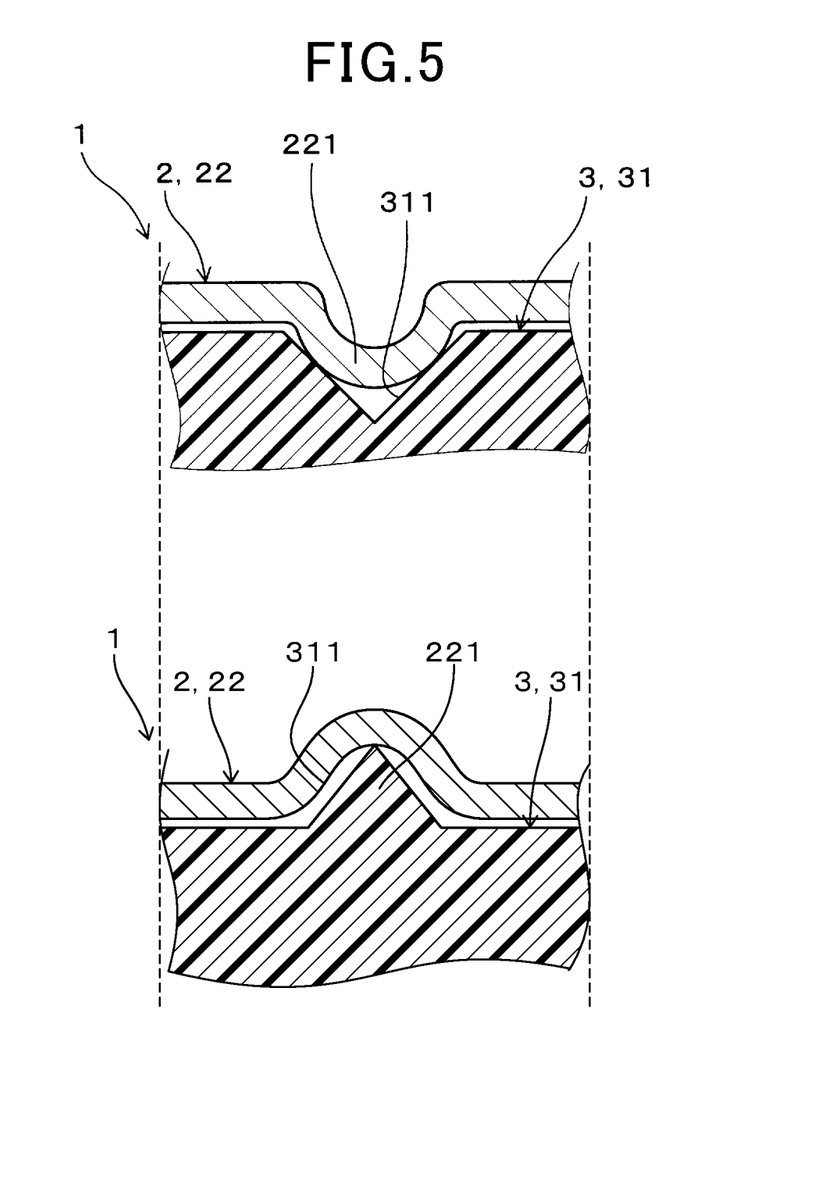
FIG. 5 is a partial cross-sectional view of FIG. 4 taken along line V-V.

As shown in FIGS. 1 to 4, the connector member 3 includes a connector cylinder part 32 whose shape in the cross section perpendicular to the axial direction X is oval, and a connector bottom part 33 having a columnar shape and located on the distal end side of the connector cylinder part 32. As shown in FIGS. 3 to 5, the connector bottom part 33 is formed with the brim part 31 having an annular shape and projecting radially outward at its outer lateral surface. The brim part 31 is formed with a pair of concave engaging portions 311 at its corners on the proximal end side. The pair of the concave engaging portions 311 are located at positions opposite to each other and corresponding to the positions of the pair of the convex engaging portions 221. Here, it is assumed that the engaging length in the axial direction X between the concave engaging portion 311 and the convex engaging portion 221 is S. FIG. 5 shows a convex engaging portion 221 formed in the housing 2 and a concave engaging portion 331 formed in the connector member 3 in the top part of FIG. 5, and also shows the convex engaging portion 221 formed in the connection member 3, and the concave engaging portion formed in the housing 2 in the bottom part of FIG. 5.

The end surface on the distal end side of the connector bottom part 33 makes the connector counter surface 301 opposite to the housing counter surface 201. The connector member 3 includes a projection part 34 having a columnar shape projecting to the distal end side from the connector counter surface 301. The height H1 in the axial direction X of the projection part 34 is smaller than the height H of the buffer member 4 compressed between the connector member 3 and the housing 2. In this embodiment, the height H is 1.33 mm, and the height H1 is 1.13 mm. Accordingly, an auxiliary gap 72 of the height H2 (=0.2 mm) is formed between the distal end surface of the projection part 34 and the housing counter surface 201. It is preferable that the engaging length S between the concave engaging portion 311 and the convex engaging portions 221 is set larger than the height H2, so that when the connector member 3 and the housing 2 are displaced from each other in the axial direction X by the height H2, the concave engaging portion 311 and the convex engaging portions 221 can be caused to engage with each other, to thereby prevent the connector member 3 and the housing 2 from rotating relative to each other.

The buffer member 4 is disposed in the gap 71 formed between the housing counter surface 201 and the connector counter surface 301. In this embodiment, the buffer member 4 is an O-ring made of fluoride rubber. The projection part 34 is inserted into the inner periphery of the buffer member 4.

The connector member 3 and the housing are fixed to each other by wrap-swaging the connection part 220 of the housing 2 to a shape wrapping the brim part 31 of the connector member 3 in a state of the buffer member 4 being disposed in the gap 71. At this time, the convex engaging portion 221 of the connection part 220 is disposed within the concave engaging portion 311. The height in the axial direction X of the gap 71, which is the same as the height H of the compressed buffer member 4, is 0.7H0 where H0 is the height of the buffer member 4 before being compressed. In this embodiment, H0 is 1.9 mm, and H=1.33 mm. Hence, the buffer member 4 disposed between the connector counter surface 301 and the housing counter surface 201 is compressed by 30% in the state of the connector member 3 and the housing 2 being fixed to each other.

Figure 8:
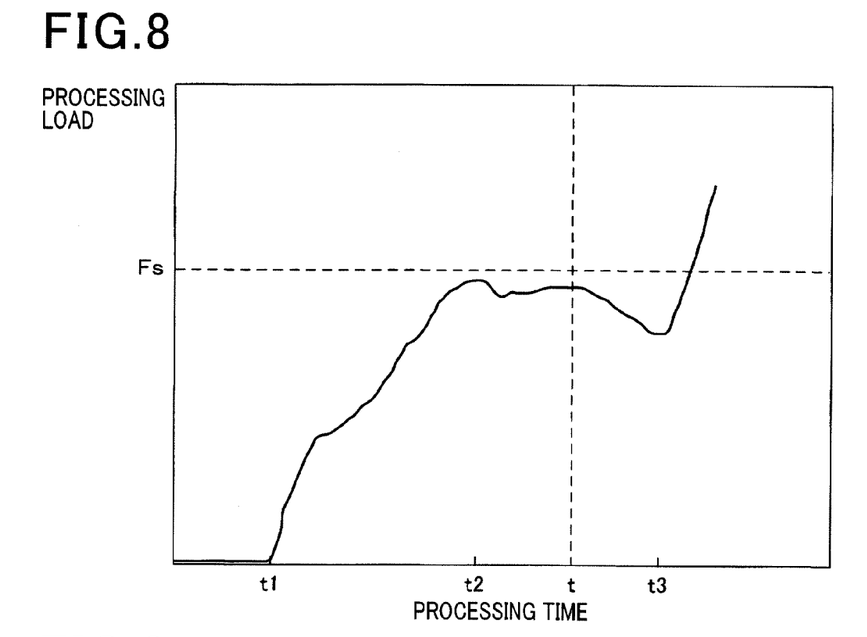
FIG. 8 is a graph showing a relationship between a processing load and a processing time during a process of manufacturing the temperature sensor according to the embodiment of the invention.

Next, a process of manufacturing the temperature sensor 1 is described. In the graph of FIG. 8, the vertical axis represents the processing load for forming the wrap-swaged part 22, and the horizontal axis represents the processing time during which an upper die is advanced.

The wrap-swaged part 22 is formed using a press machine (not shown) including the upper die and lower die arranged in the axial direction. The upper die has an annular shape and includes a processing surface for forming the wrap-swaged part 22 from the connection part 220. The upper die is configured to be movable back and forth in the axial direction X. The processing surface has roughly the same outer shape as the wrap-swaged part 22. The upper die is advanced toward the lower die holding the housing 2 to sandwich the connection part 220 therebetween. As a result, the open end of the connection part 220 is deformed radially inward so as to extend toward the lower die to thereby form the wrap-swaged part 22.

To form the wrap-swaged part 22, the processing load F and the processing time t are measured. As shown in FIG. 8, the processing load starts to increase at time t1 at which the upper die contacts the connection part 220. The material of the connection part 220 yields at time t2, and the processing load starts to decrease. Thereafter, at time t3, the processing load starts to increase again. At this time, as shown in FIG. 7, the projection part 34 is in contact with the housing member 2. After time t3, the wrap-swaged part 22 is formed while bending the connector member 3.

The formation of the wrap-swaged part 22 is completed at the moment when the processing time t exceeds a threshold time ts and the processing load F reaches a threshold load Fs. The threshold time ts and the threshold load Fs can be determined by performing a preliminary test. The threshold load Fs is set taking into account the springback which occurs during formation of the wrap-swaged part 22. By using this springback, the auxiliary gap 72 can be formed easily between the projection part 34 and the housing 72.

Figure 9:
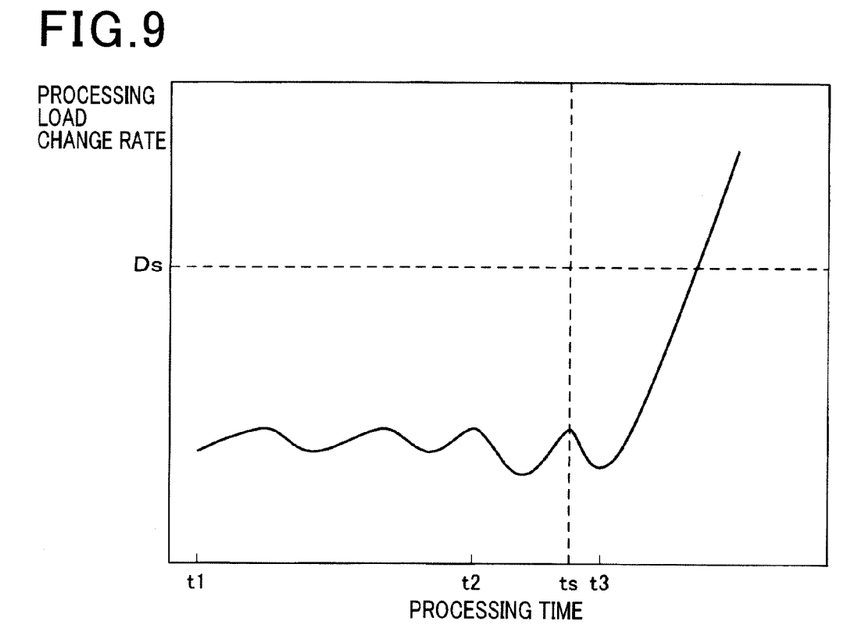
FIG. 9 is a graph showing a relationship between a processing load change rate and the processing time during the process of manufacturing the temperature sensor according to the embodiment of the invention.

In the graph of FIG. 9, the vertical axis represents a processing load change rate ($\Delta(F^2)/\Delta t$) which is the time differential value of the square of the processing load, and the horizontal axis represents the processing time. As seen from the graph of FIG. 9, the processing load change rate increases sharply after time t3. Accordingly, the wrap-swaged part 22 can be formed easily by appropriately setting the threshold time ts and the threshold load Fs.

Next, advantages of the above described embodiment are explained. The connector counter surface 301 and the housing counter surface 201 are disposed separately from each other, and the gap 71 is formed between them. The connector member 3 and the housing 2 can move relative to each other since the buffer member 4 disposed in the gap 71 is deformable. Accordingly, when vibration is transmitted to the housing 2, since the housing 2 and the connector member 3 move relative to each other in the axial direction X, the vibration is reduced. Further, since the buffer member 4 absorbs the vibration, it is possible to effectively suppress the vibration from being transmitted to the connector member 3.

The connector member 3 and the housing 2 are connected to each other through the buffer member 4. Accordingly, since the buffer member 4 deforms elastically when the connector member 3 and the housing 2 are fixed to each other, the stress applied between the connector member 3 and the housing 2 can be reduced. Accordingly, the temperature sensor 1 can be manufactured easily, because it is not necessary to perform management for the express purpose of reducing the stress.

The buffer member 4 is an O-ring disposed such that its center axis is coaxial with the longitudinal axis of the housing parallel to the axial direction X. The connector counter surface 301 is formed with the projection part 34 projecting toward the housing 2 to be inserted into the O-ring. The height H2 in the axial direction of the projection part 34 is smaller than the height H in the axial direction of the buffer member 4 disposed between the housing 2 and the connector member 3. The auxiliary gap 72 is formed between the projection part 34 and the housing counter surface 201. Accordingly, since the projection part 34 serves as a positioning member for positioning the buffer member 4, it is possible to dispose the buffer member 4 in the gap 71 easily and accurately. Further, the provision of the auxiliary gap 72 prevents the housing 2 and the connector member 3 from contacting with each other. This reduces the vibration transmitted from the housing 2 to the connector member 3.

The housing 2 is formed with at least one convex engaging portion 221 projecting toward the connector member 3. The connector member 3 is formed with the concave engaging portion 311 concaved toward the side opposite to the housing 2 at a position corresponding to the convex engaging portion 221. The convex engaging portion 221 is disposed inside the concave engaging portion 311. Accordingly, since the connector member 3 and the housing 2 can be prevented from rotating relative to each other, the connection member 3 can be positioned easily.

The buffer member 4 is made of fluoride rubber which is highly resistant to heat. Accordingly, the temperature sensor 1 can be used in a high temperature environment while preventing deterioration of the buffer member 4.

The connector member 3 and the O-ring are disposed at an appropriate distance (gap) from each other using the O-ring and the wrap-swaged part 22. Accordingly, thermal transmission from the housing 2 to the connector member can be greatly reduced, and accordingly thermal deterioration of the connector member 3 can be greatly reduced compared to conventional temperature sensors in which the housing and connector member are fixed in position using an additional member such as a spring.

The buffer member 4 is compressed such that its height is compressed by 18 to 30% when disposed between the housing 2 and the connector member 30 compared to its initial height H0 before being disposed between the housing 2 and the connector member 30. Accordingly, since the buffer member 4 can be deformed elastically even after it deteriorates, it is possible to prevent vibration transmission between the housing 2 and the connector member 30.

The connector member 3 includes the brim part 31 projecting in the direction perpendicular to the axial direction X. The housing 2 includes the wrap-swaged part 22 formed by deforming the cylindrical connection part 220 extending toward the connector member 3 so as to wrap the brim part 31. The connector member 3 and the housing 2 are fixed to each other by the wrap-swage structure constituted of the brim part 31 and the wrap-swaged part 22.

In forming the wrap-swaged part 22, the processing load for deforming the connection part 220 and the processing time elapsed from the moment at which the connection part 220 starts to be deformed are measured. When the processing load exceeds a predetermined threshold load and the processing time exceeds a predetermined threshold time, formation of the wrap-swaged part 22 is finished. To enable the housing 2 and the connector member 3 to move relative to each other, it is necessary to provide a space between them. By measuring the processing load while the wrap-swaged part 22 is formed, this necessary space can be provided easily. The processing load changes depending on the state of deformation of the connection part 220 and the distance between the housing 2 and the connector member 3. Accordingly, by measuring the processing load, the state of formation of the wrap-swaged part 22 can be detected and the shape which the wrap-swaged part 22 will finally take can be estimated easily. Hence, the wrap-swaged part 22 can be formed easily such that the housing 2 and the connector member 3 can move relative to each other in the axial direction X. In addition, measuring both the processing load and the processing time makes it possible to detect an abnormal increase of the processing load to prevent occurrence of formation failure of the wrap-swaged part 22.

As explained above, according to the above described embodiment, there are provided the temperature sensor 1 in which transmission of vibration to the connector member 3 can be greatly suppressed, and the process of manufacturing the temperature sensor 1 at a high productivity.

Confirmation Test

A resonance frequency and resonance magnification were measured for each of samples 1 to 3. Each of samples 1 to 3 is constituted of the housing 2, connector member 3 and the buffer member 4 as described in the above described embodiment. In sample 1, the height H of the gap 71, the height H1 of the projection part 34, the height H2 of the auxiliary gap 72 and the height H0 of the buffer member 4 are the same as those of the temperature sensor 1 of the above described embodiment.

In sample 2, the height H of the gap 71 is 1.13 mm, and the height H2 of the auxiliary gap 72 is 0 mm. That is, the projection part 34 is in contact with the housing counter surface 201. Sample 3 is different from sample 2 in that the housing 2 and the connector member 3 are strongly contacted with each other in sample 3. The height H of the gap 71 and the height H2 of the auxiliary gap 72 are the same as sample 2. However, the wrap-swaged part is formed so as to enter the connector member 3 by the distance of 0.03 mm.

Figure 10:
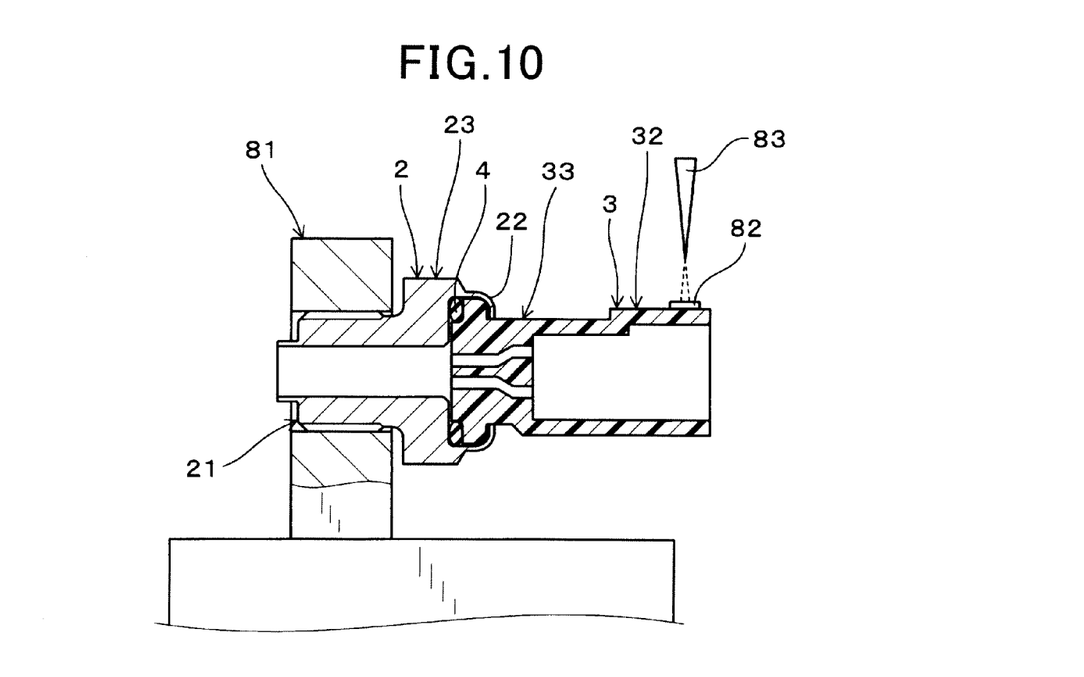
FIG. 10 is a diagram showing a sample of the temperature sensor and a jig used in a confirmation test.

As shown in FIG. 10, each of samples 1 to 3 was fixed by screwing the housing 2 into a tapped hole formed in the jig 81 connected to a vibration exciter. The resonance magnification was measured for each of samples 1 to 3 using a laser Doppler vibration meter 83 while changing the frequency of the vibration excited by the vibration exciter. For each of samples 1 to 3, a reflective tape was stuck to the connector member 3, and a laser from the laser Doppler vibration meter 83 was applied to the reflective tape.

Figure 11:
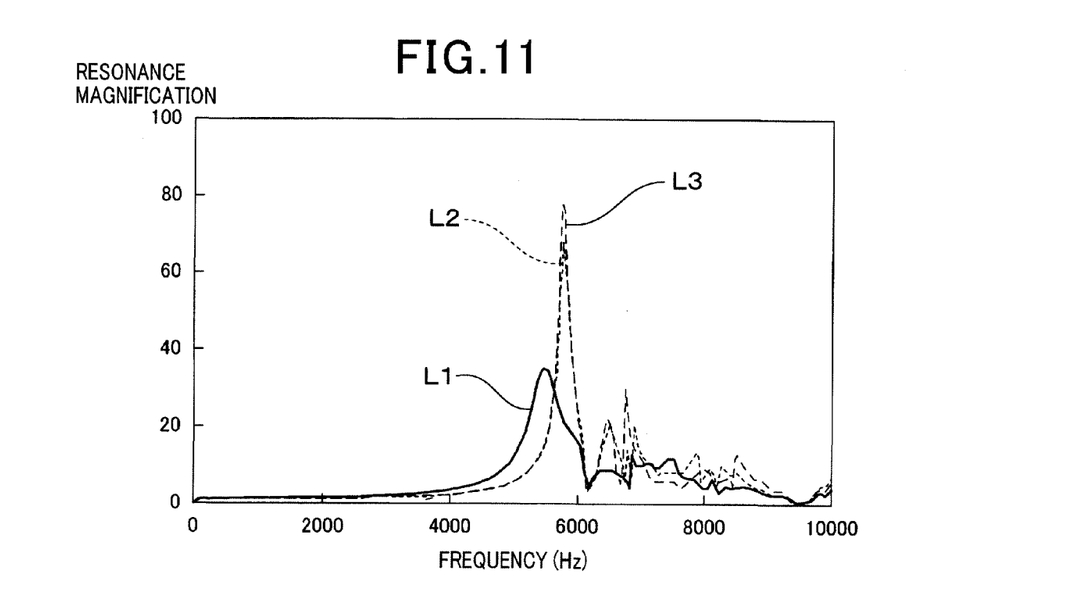
FIG. 11 is a graph showing a relationship between a resonance magnification and a frequency of vibration for each of three samples measured in the confirmation test.

FIG. 11 is a graph showing the results of the confirmation test. In this graph, the vertical axis represents the resonance magnification, and the horizontal axis represents the frequency of the vibration excited by the vibration exciter. The solid lines L1, L2 and L3 correspond to sample 1, sample 2 and sample 3, respectively. From this graph, it was confirmed that the resonance magnification and resonance frequency of sample 1 are smaller than those of samples 2 and 3. Hence, it was confirmed that vibration transmission from the housing 2 to the connector member 3 can be effectively reduced in the temperature sensor 1 according to the embodiment of the invention.

The above explained preferred embodiments are exemplary of the invention of the present application which is described solely by the claims appended below. It should be understood that modifications of the preferred embodiments may be made as would occur to one of skill in the art.

What is claimed is:

1. A temperature sensor comprising:
    a temperature detecting section including a temperature-sensitive element;
    a cylindrical housing disposed on a proximal end side of the temperature detecting section;
    a connector member disposed on a proximal end side of the housing; and
    a buffer member which is elastically deformable and disposed between the connector member and the housing, wherein
    the connector member includes a connector counter surface located on a side of the housing in an axial direction along a longitudinal axis of the housing;
    the housing includes a housing counter surface located opposite to the connector counter surface,
    the housing counter surface and the connector counter surface are separated from each other so that a gap is present therebetween, and
    the buffer member is disposed deformably in the gap so that the connector member and the housing are movable relative to each other in the axial direction, wherein
    the buffer member is an O-ring having an annular shape, and disposed such that a center axis thereof is coaxial with the longitudinal axis of the housing, the connector counter surface is formed with a projection part projecting toward the housing so as to be inserted into the O-ring, a projection height of the projection part in the axial direction is smaller than a height of the O-ring compressed between the housing and the connector member, and an auxiliary gap is formed between the projection part and the housing counter surface.

2. The temperature sensor according to claim 1, wherein at least one convex engaging portion is formed in one of the housing and the connector member so as to project toward the other of the housing and the connector member, and a concave engaging portion is formed in the other of the housing and the connector member at a position corresponding to the convex engaging portion so as to be concave toward the one of the housing and the connector member, the convex engaging portion being disposed inside the concave engaging portion.

3. The temperature sensor according to claim 1, wherein the buffer member is made of fluoride rubber.

4. The temperature sensor according to claim 1, wherein a height of the buffer member disposed between the housing and the connector member is compressed by 18% to 30% compared to an initial height thereof, the initial height being the height before the buffer member was disposed between the housing and the connector member.

5. The temperature sensor according to claim 1, wherein the connector member includes a brim part projecting in a radial direction perpendicular to the axial direction, the housing includes a wrap-swaged part formed by deforming a cylindrical connection part thereof which extends toward the connector member to a shape wrapping the brim part, the connector member and the housing being fixed to each other by a wrap-swage structure constituted of the brim part and the wrap-swaged part.

6. A process of manufacturing a temperature sensor, the temperature sensor including:

a temperature detecting section including a temperature-sensitive element;

a cylindrical housing disposed on a proximal end side of the temperature detecting section;

a connector member disposed on a proximal end side of the housing; and a buffer member which is elastically deformable and disposed between the connector member and the housing, the connector member including a connector counter surface located on a side of the housing in an axial direction along a longitudinal axis of the housing, the housing including a housing counter surface opposite to the connector counter surface, the housing counter surface and the connector counter surface being separated from each other so that a gap is present therebetween, the buffer member being disposed deformably in the gap so that the connector member and the housing are movable relative to each other in the axial direction, the connector member including a brim part projecting in a radial direction perpendicular to the axial direction, the housing including a cylindrical connection part which extends toward the connector member so as to house the brim part therein, the process comprising the steps of:

disposing the brim part inside the connection part in a state where the buffer member is disposed in the gap; and deforming one end portion on a side of the connector member of the connection part such that the one end portion extends toward the housing within the connection part to form a wrap-swaged part wrapping the brim part therein, wherein a processing load for deforming the connection part and a processing time elapsed from when the connection part starts to be deformed are measured during formation of the wrap-swaged part, the formation of the wrap-swaged part being finished when the processing load exceeds a predetermined threshold load and the processing time exceeds a predetermined threshold time.

7. A temperature sensor comprising:

a temperature detecting section including a temperature-sensitive element;

a cylindrical housing disposed on a proximal end side of the temperature detecting section;

a connector member disposed on a proximal end side of the housing; and a buffer member which is elastically deformable and disposed between the connector member and the housing, wherein the connector member includes a connector counter surface located on a side of the housing in an axial direction along a longitudinal axis of the housing;

the housing includes a housing counter surface located opposite to the connector counter surface, the housing counter surface and the connector counter surface are separated from each other so that a gap is present therebetween, and the buffer member is disposed deformably in the gap so that the connector member and the housing are movable relative to each other in the axial direction, wherein at least one convex engaging portion is formed in one of the housing and the connector member so as to project toward the other of the housing and the connector member, and a concave engaging portion is formed in the other of the housing and the connector member at a position corresponding to the convex engaging portion so as to be concave toward the one of the housing and the connector member, the convex engaging portion being disposed inside the concave engaging portion.

* * * * *